US010153477B2

(12) United States Patent
Yamamoto

(10) Patent No.: US 10,153,477 B2
(45) Date of Patent: Dec. 11, 2018

(54) LITHIUM-ION SECONDARY BATTERY AND METHOD OF PRODUCING THE SAME

(71) Applicant: NEC ENERGY DEVICES, LTD., Sagamihara-shi, Kanagawa (JP)

(72) Inventor: Yoshimasa Yamamoto, Sagamihara (JP)

(73) Assignee: NEC ENERGY DEVICES, LTD., Sagamihara-shi, Kanagawa (JP)

( * ) Notice: Subject to any disclaimer, the term of this patent is extended or adjusted under 35 U.S.C. 154(b) by 165 days.

(21) Appl. No.: 15/389,796

(22) Filed: Dec. 23, 2016

(65) Prior Publication Data
US 2017/0110707 A1 Apr. 20, 2017

Related U.S. Application Data

(63) Continuation of application No. 14/430,244, filed as application No. PCT/JP2013/076108 on Sep. 26, 2013, now Pat. No. 9,570,776.

(30) Foreign Application Priority Data

Sep. 27, 2012 (JP) .................................. 2012-214198
Mar. 13, 2013 (JP) .................................. 2013-050362

(51) Int. Cl.
*H01M 2/22* (2006.01)
*H01M 2/26* (2006.01)
(Continued)

(52) U.S. Cl.
CPC ............ *H01M 2/266* (2013.01); *H01M 2/162* (2013.01); *H01M 2/1653* (2013.01);
(Continued)

(58) Field of Classification Search
CPC ...... H01M 2/266; H01M 4/525; H01M 4/623; H01M 4/625; H01M 4/661; H01M 2/162;
(Continued)

(56) References Cited

U.S. PATENT DOCUMENTS

2010/0143787 A1 6/2010 Jung et al.
2010/0255356 A1 10/2010 Fujii et al.

FOREIGN PATENT DOCUMENTS

CN 101521291 A 9/2009
JP 2000-030742 A 1/2000
(Continued)

OTHER PUBLICATIONS

Communication dated May 2, 2018 issue by the Japanese Patent Office in counterpart Japanese application No. 2017-126045.
(Continued)

*Primary Examiner* — Cynthia K Walls
(74) *Attorney, Agent, or Firm* — Sughrue Mion, PLLC

(57) ABSTRACT

Provided is a battery in which collector foil is unlikely to break.

In a lithium-ion secondary battery, as for a distance from a connection section between a positive electrode tab and the positive electrode terminal to a boundary section between applying and non-applying sections of positive-electrode active material in a direction perpendicular to a stacking direction, compared with a reference positive electrode having the boundary section that is located farthest to the connection section by straight-line distance, a layer of a positive electrode that is stacked in such a way as to be farthest from the reference positive electrode has a smaller distance from a boundary of the applying and non-applying sections of the positive-electrode active material to a connection section with the positive electrode tab in a direction perpendicular to a stacking direction.

8 Claims, 5 Drawing Sheets

(51) Int. Cl.

| | |
|---|---|
| *H01M 10/0585* | (2010.01) |
| *H01M 4/04* | (2006.01) |
| *H01M 10/0525* | (2010.01) |
| *H01M 2/16* | (2006.01) |
| *H01M 2/30* | (2006.01) |
| *H01M 4/131* | (2010.01) |
| *H01M 4/133* | (2010.01) |
| *H01M 4/525* | (2010.01) |
| *H01M 4/587* | (2010.01) |
| *H01M 4/62* | (2006.01) |
| *H01M 4/66* | (2006.01) |
| *H01M 4/1391* | (2010.01) |
| *H01M 4/70* | (2006.01) |
| *H01M 4/1393* | (2010.01) |
| *H01M 4/02* | (2006.01) |

(52) U.S. Cl.
CPC .......... *H01M 2/1673* (2013.01); *H01M 2/30* (2013.01); *H01M 2/305* (2013.01); *H01M 4/0404* (2013.01); *H01M 4/131* (2013.01); *H01M 4/133* (2013.01); *H01M 4/525* (2013.01); *H01M 4/587* (2013.01); *H01M 4/623* (2013.01); *H01M 4/625* (2013.01); *H01M 4/661* (2013.01); *H01M 10/0525* (2013.01); *H01M 10/0585* (2013.01); *H01M 4/1391* (2013.01); *H01M 4/1393* (2013.01); *H01M 4/70* (2013.01); *H01M 2004/021* (2013.01); *H01M 2004/027* (2013.01); *H01M 2004/028* (2013.01); *H01M 2220/20* (2013.01); *Y02E 60/122* (2013.01); *Y02P 70/54* (2015.11); *Y02T 10/7011* (2013.01); *Y10T 29/49108* (2015.01)

(58) Field of Classification Search
CPC .... H01M 4/133; H01M 4/131; H01M 2/1653; H01M 2/305; H01M 4/587; H01M 2/30; H01M 2/1673; H01M 10/0525; H01M 4/0404; H01M 10/0585; H01M 2004/021; H01M 4/1393; H01M 2004/027; H01M 2004/028; H01M 2220/20; H01M 4/70; H01M 4/1391; Y02T 10/7011; Y02P 70/54; Y10T 29/49108; Y02E 60/122
See application file for complete search history.

(56) References Cited

FOREIGN PATENT DOCUMENTS

| | | |
|---|---|---|
| JP | 2002-373649 A | 12/2002 |
| JP | 2004-171954 A | 6/2004 |
| JP | 2005-142028 A | 6/2005 |
| JP | 2005-149783 A | 6/2005 |
| JP | 2005-310588 A | 11/2005 |
| JP | 2006-139994 A | 6/2006 |
| JP | 2010-509711 A | 3/2010 |
| JP | 2010-135226 A | 6/2010 |
| JP | 2010-232469 A | 10/2010 |
| JP | 2012-53987 A | 3/2012 |
| JP | 2012-54003 A | 3/2012 |
| WO | 2010134170 A1 | 11/2010 |
| WO | 2012/117883 A1 | 9/2012 |
| WO | 2014/050988 A1 | 8/2016 |

OTHER PUBLICATIONS

Communication dated May 30, 2016, from the State Intellectual Property Office of People's Republic of China in counterpart application No. 201380050322.0.

International Search Report of PCT/JP2013/076108, dated Dec. 3, 2013. [PCT/ISA/210].

Communication dated Apr. 5, 2017, from the Japanese Patent Office in counterpart application No. 2014-538596.

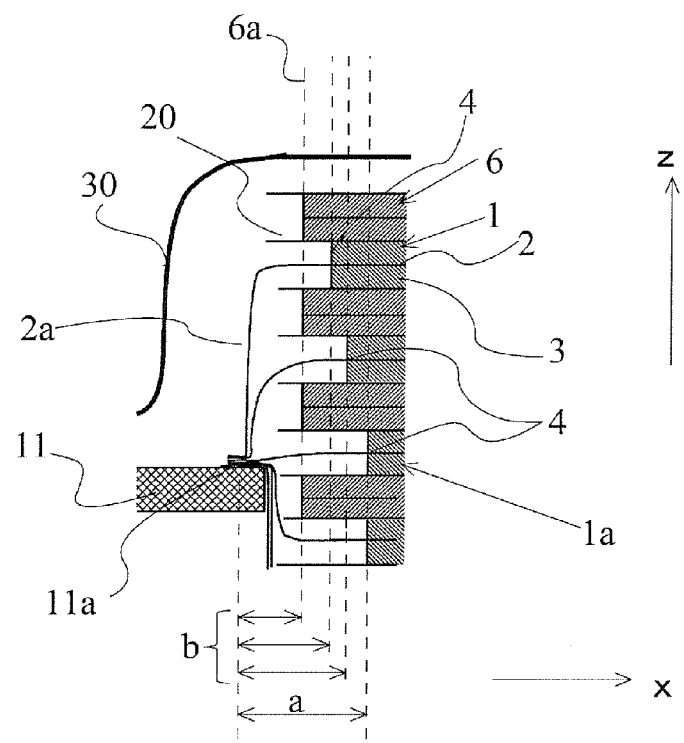
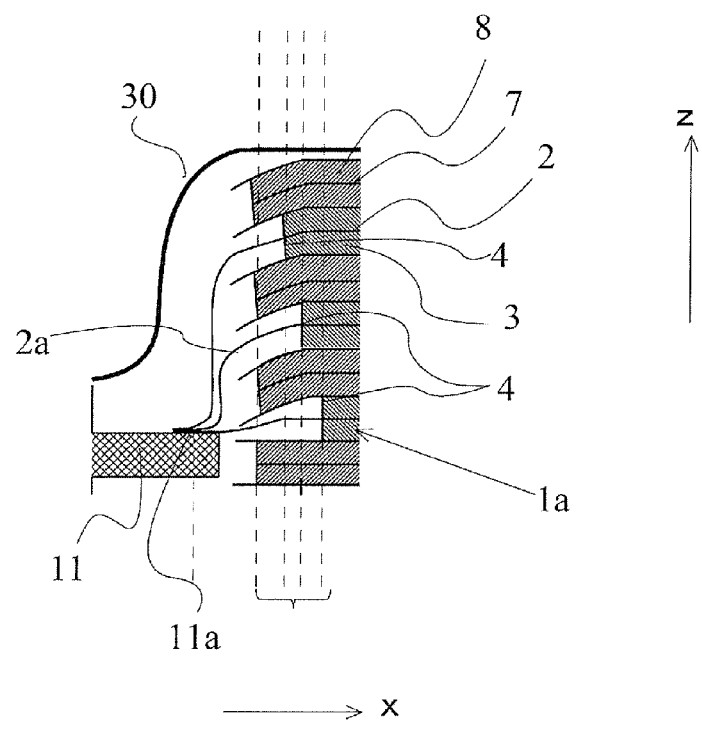

FIG..8
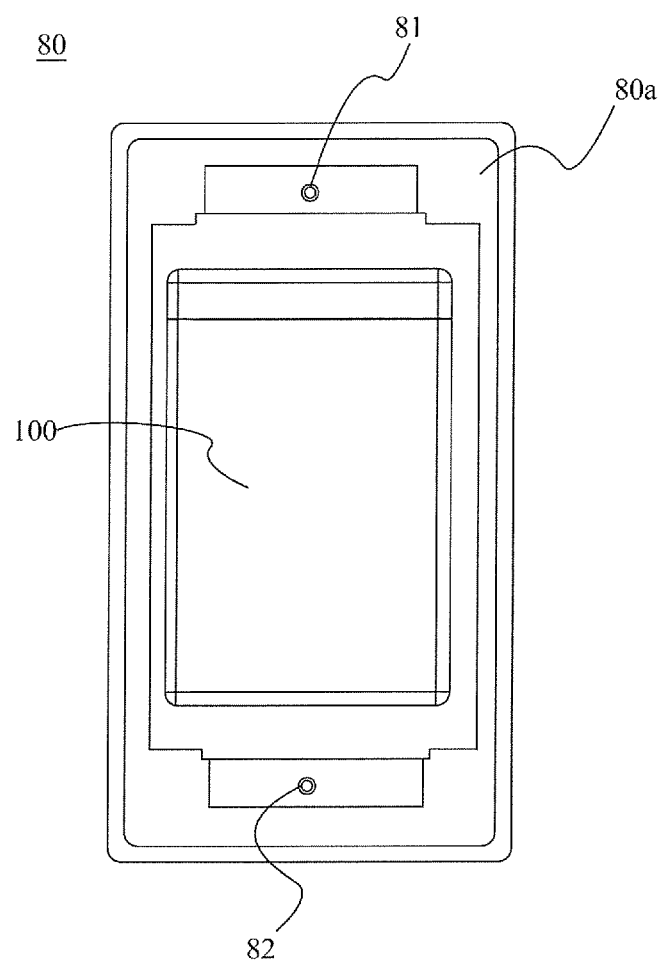

LITHIUM-ION SECONDARY BATTERY AND METHOD OF PRODUCING THE SAME

CROSS-REFERENCE TO RELATED APPLICATIONS

This application is a Continuation of U.S. patent application Ser. No. 14/430,244, filed on Mar. 23, 2015, which is a National Stage of International Application No. PCT/JP2013/076108, filed on Sep. 26, 2013, which claims priority from Japanese Patent Application No. 2012-214198 filed Sep. 27, 2012, and Japanese Patent Application No. 2013-050362 filed Mar. 13, 2013, the contents of all of which are incorporated herein by reference in their entirety.

TECHNICAL FIELD

The present invention relates to a lithium-ion secondary battery that is high in strength against vibration and shock and whose opening is sealed with a film exterior material.

BACKGROUND ART

In devices that use a battery as a drive power source, such as electric bicycles, electric motorcycles, and electric cars, a battery pack that houses large-capacity secondary batteries is used. Lithium-ion secondary batteries that are high in both volumetric energy density and mass energy density are suitable as drive-power-source batteries.

Among the known lithium-ion batteries are a columnar battery, which is made by winding up a stacked product in which a positive electrode and a negative electrode are stacked through a separator, and a flat battery, which is a stacked product in which a positive electrode and a negative electrode are stacked through a separator.

Among those batteries, the flat battery is suitable as a power-source battery for a power motor and the like, because the capacity can be easily increased per unit battery by increasing the areas of the positive and negative electrodes or by increasing the number of positive and negative electrodes stacked.

Even if the number of positive and negative electrodes that are stacked as battery elements is increased to increase the capacity per unit battery, in order to minimize an increase in the volume of the battery, the distances from a positive electrode tab and a negative electrode tab, which are taken out from the positive and negative electrodes and are used for conductive connection, to a positive electrode pull-out tab and a negative electrode pull-out tab need to be made shorter. Meanwhile, if the positive electrode tab and the negative electrode tab are being connected to the positive electrode pull-out tab and the negative electrode pull-out tab by the shortest distances, the curvature of the positive and negative electrode tabs gradually increases as the battery elements are located closer to an outer surface of a stacked body. Therefore, if a large force is applied to the positive and negative electrode tabs, the possibility is high that the positive and negative electrode tabs would break.

As a solution to the above problem, for example, Patent Document 1 is proposed.

Incidentally, in the lithium-ion secondary battery, in order to avoid the deposition of metallic lithium in an end portion of the negative electrode at the time of charging, the negative electrode is made larger than the positive electrode, and, in a portion of the negative electrode that faces a portion to which a positive-electrode active material has been applied, a negative-electrode active material needs to be formed.

PRIOR ART DOCUMENT

Patent Document

Patent Document 1: JP2005-142028A

SUMMARY OF THE INVENTION

Problems to be Solved by the Invention

However, when a film exterior material is used, the exterior material itself can easily deform. If the exterior material is deformed in a portion where a tab exists, the exterior material might come in contact with an electrode tab near an outermost layer with a large curvature, or other trouble could happen. As a result, the possibility is high that the outermost layer or the positive and negative electrode tabs near the outermost layer break. Moreover, as the layers stacked are further increased in number, a negative electrode that is closer to the outermost layer tends to have a larger curvature. In particular, the curvature is large near a portion that faces a positive electrode end, resulting in an increase in the stress on the negative electrode.

The active materials contain a binder that is a minimum necessity, and are being bound to each other and to a current collector. Therefore, the possibility is higher that cracks would emerge on a surface of a negative-electrode active material corresponding to the positive electrode end and in an internal portion; that the active materials would drop; and that collector foil would break.

Meanwhile, in order to avoid an increase in the curvature, one idea is to make an electrode long enough to ensure that the electrode is gradually bent. In this case, however, the problem is that the per-unit-volume capacity of the battery is small.

Moreover, Patent Document 1 does not take into account the breakage of positive-electrode-side electrode foil at all.

Accordingly, the present invention is intended to provide a lithium-ion secondary battery in which the cracks and the dropping of the active material and the breakage of collector foil are unlikely to occur even if a large number of layers are stacked, and a method of producing the lithium-ion secondary battery.

Means for Solving the Problems

The problems of the present invention are solved by a lithium-ion secondary battery that includes: an electrode-stacked body including a positive electrode that includes an applying section of positive-electrode active material on a positive electrode current collector, and a non-applying section of positive-electrode active material which becomes a positive electrode tab, a negative electrode that includes an applying section of negative-electrode active material on a negative electrode current collector, and a non-applying section of negative-electrode active material which becomes a negative electrode tab, and a separator, wherein a plurality of the positive electrodes and negative electrodes are alternately stacked via separators; a positive electrode terminal that is electrically connected to the positive electrode tabs; a negative electrode terminal that is electrically connected to the negative electrode tabs, wherein the electrode-stacked body, an electrolysis solution, the positive electrode terminal, and the negative electrode terminal are housed in an exterior body except for one end of the positive electrode terminal and one end of the negative electrode terminal, and, as for a horizontal distance from a connection section between the positive electrode tab and the positive electrode terminal to a boundary section between the applying and non-applying sections of positive-electrode active material, a positive electrode that is stacked in such a way as to be farthest from a reference positive electrode has a shorter distance than the reference positive electrode having the boundary section that is farthest from the connection section by straight-line distance.

Advantages of the Invention

As for a horizontal distance from a connection section between the positive electrode tab and the positive electrode terminal to a boundary section between the applying and non-applying sections of positive-electrode active material, compared with a reference positive electrode that is located farthest from the connection section by straight-line distance, a positive electrode that is stacked in such a way as to be farthest from the reference positive electrode has a horizontal distance from a boundary of the applying and non-applying sections of the positive-electrode active material to a connection section between the positive electrode tab and the positive electrode terminal. Therefore, it is possible to provide a lithium-ion secondary battery that has high resistance against shock and vibration.

BRIEF DESCRIPTION OF THE DRAWINGS

FIG. 1A is a plan view, and FIG. 1B is a cross-sectional view of FIG. 1A taken along line A-A'.

FIG. 2 is an enlarged view illustrating a portion of C near a positive electrode terminal in FIG. 1.

FIG. 3 is an enlarged view illustrating a portion of C near a positive electrode terminal in FIG. 1.

FIG. 8 is a diagram illustrating an evaluation casing of a lithium-ion secondary battery.

BEST MODE FOR CARRYING OUT THE INVENTION

Hereinafter, embodiments of the present invention will be described with reference to the accompanying drawings.

Figure 1A:
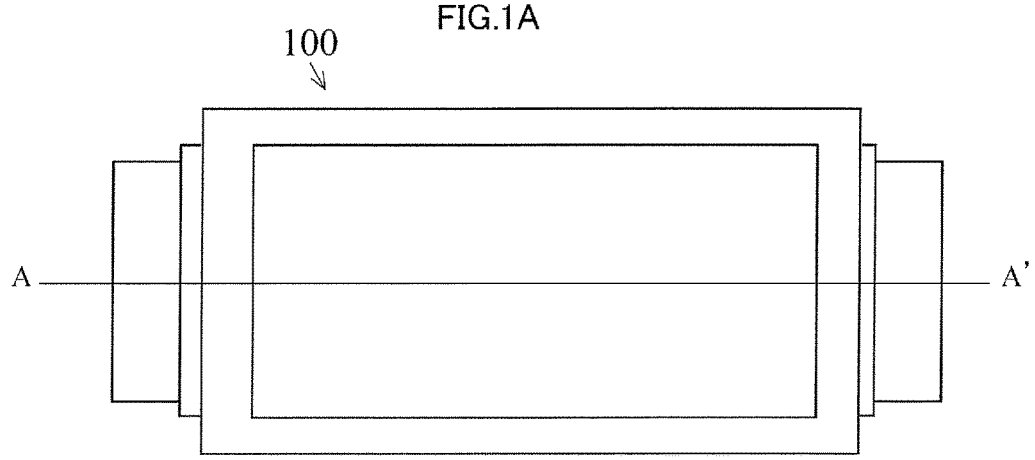
FIG. 1A and FIG. 1B are diagrams illustrating a lithium-ion secondary battery.
Figure 1B:
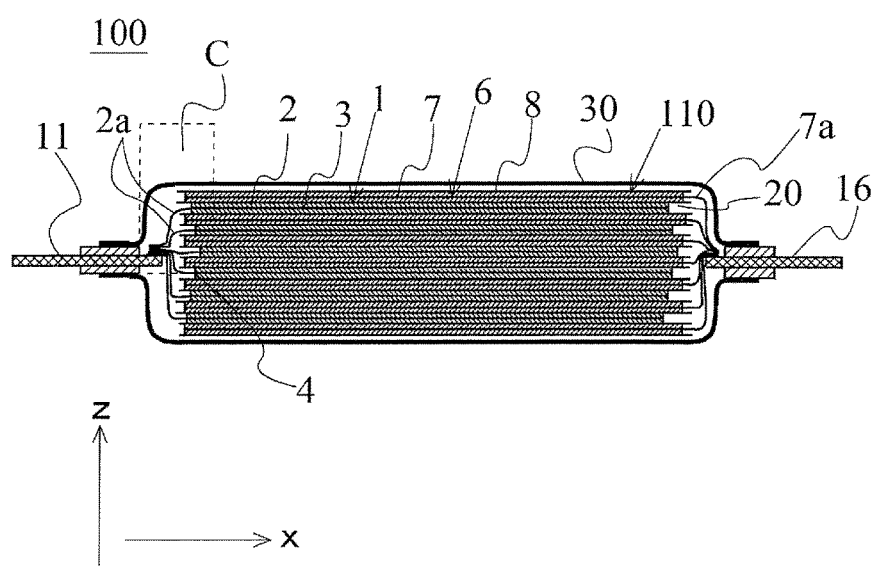

FIG. 1 is diagrams illustrating a lithium-ion secondary battery: FIG. 1A is a plan view, and FIG. 1B is a cross-sectional view of FIG. 1A taken along line A-A'.

A lithium-ion secondary battery 100 of the present invention includes a power generation element 110 in which a plurality of positive electrodes 1 and a plurality of negative electrodes 6 are alternately stacked through separators 20. The power generation element 110 and electrolysis solution (not shown) are covered with a flexible film 30. To the power generation element 110, a positive electrode terminal 11 and a negative electrode terminal 16 are electrically connected. Portions or all of the positive electrode terminal 11 and negative electrode terminal 16 have been pulled out of the flexible film 30.

In the positive electrode 1, on the front and back sides of a positive electrode current collector 2 made of aluminum, a positive-electrode active material applying section 3, to which a composition containing a positive-electrode active material, a conductive auxiliary agent, a binding agent, and the like has been applied, is formed.

The positive-electrode active material applying section 3 mainly includes one, or two or more, of the following substances: lithium manganese composite oxides, lithium cobalt composite oxides, lithium nickel composite oxides, and lithium-transition metal composite oxides such as olivine-based materials like $LiFePO_4$.

The positive-electrode active material applying section 3 can be made by mixing this and a conductive auxiliary agent such as carbon black, and applying and drying the composition into which a binding agent, such as polyvinylidene fluoride, polytetrafluoroethylene, carboxymethylcellulose, or modified acrylonitrile rubber particles, has been blended.

In the negative electrode 6, on the front and back sides of a negative electrode current collector 7 made of copper, a negative-electrode active material applying section 8, to which a composition containing a negative-electrode active material, a conductive auxiliary agent, a binding agent, and the like has been applied, is formed.

The negative-electrode active material applying section 8 mainly includes graphite, which absorbs or discharges lithium ions at the time of charging or discharging, amorphous carbon, diamond-like carbon, fullerene, carbon nanotube, carbon nano horn, or any other carbon material, and a compound containing silicon and tin.

The negative-electrode active material applying section 8 can be made by mixing this and a conductive auxiliary agent such as carbon black, and applying and drying the composition into which a binding agent, such as polyvinylidene fluoride, polytetrafluoroethylene, carboxymethylcellulose, or modified acrylonitrile rubber particles, has been blended.

As the positive electrode current collector, aluminum, stainless steel, nickel, titanium, or an alloy of these substances may be used. Aluminum is particularly preferred. As the negative electrode current collector, copper, stainless steel, nickel, titanium, or an alloy of these substances may be used.

As the separator, porous membranes, woven fabrics, and nonwoven fabrics are available. In particular, one, or two or more, of polypropylene- and polyethylene-based porous membranes may be used.

As the electrolysis solution, one, or two or more, of organic solvents, such as chain carbonates, cyclic carbonates, aliphatic carboxylic acid esters, γ-lactones including γ-butyrolactone, chain ethers, and cyclic ethers, are mixed, and the organic solvents in which lithium salts such as LiPF6 have been dissolved can be used.

The chain carbonates include ethyl methyl carbonate (EMC), diethyl carbonate (DEC), dimethyl carbonate (DMC), and dipropyl carbonate (DPC), such as ethylene carbonate, propylene carbonate, vinylene carbonate, and butylene carbonate.

As the flexible film that covers the lithium-ion secondary battery of the present invention, a film in which resin layers are provided on the front and back sides of a base material or a metal layer can be used.

As the metal layer, a metal layer having barrier properties, such as those designed to prevent the leak of electrolysis solution or the intrusion of water from outside, may be selected. Aluminum, stainless steel, or the like may be used. At least on one side of the metal layer, a heat-welding resin layer, such as modified polyolefin, is provided in such a way as to face a heat-welding resin layer of the flexible film, and the periphery of a portion in which an electrode-stacked body is housed is thermally welded to form an exterior body.

On an exterior body's surface that is on the opposite side from the surface where the heat-welding resin layer is formed, a resin layer, such as nylon film or polyester film, may be provided.

As the positive electrode terminal, a positive electrode terminal made of aluminum or aluminum alloy may be used. As the negative electrode terminal, a negative electrode terminal made of copper or copper alloy, or a negative electrode terminal that is made by plating such a terminal with nickel may be used.

Each of the terminals is pulled out of the flexible film. In an area of each terminal that is located in a portion where the periphery of the exterior body is thermally welded, heat-welding resin may be provided in advance.

A non-applying section of a positive-electrode active material in the positive electrode current collector is regarded as a positive electrode tab 2a, which is connected to the positive electrode terminal. A non-applying section of a negative-electrode active material in the negative electrode current collector is regarded as a negative electrode tab 7a, which is connected to the negative electrode terminal.

On the positive electrode terminal, the positive electrode tabs are connected together along with the positive electrode terminal by ultrasonic welding or any other method. On the negative electrode terminal, the negative electrode tabs are connected together along with the negative electrode terminal by ultrasonic welding or any other method.

Then, one end of the positive electrode terminal is pulled out of the flexible film, and one end of the negative electrode terminal is pulled out of the flexible film.

In order to prevent the deposition of lithium metal in an outer peripheral portion of the negative electrode at the time of charging, the negative-electrode active material applying section 8 is made larger than the external dimensions of the positive-electrode active material applying section 3 that faces the negative-electrode active material applying section 8. In order to prevent contact between the positive and negative electrodes, the separators 20 are larger than the external dimensions of both.

As for the lithium-ion secondary battery of the present invention, in FIG. 1, the direction in which the positive electrodes 1, the negative electrodes 6, and the separators 20 are stacked is defined as z-direction; the direction that is perpendicular to z-direction and is from the side from which the positive electrode terminal 11 is pulled out to the side of the negative electrode terminal that faces the positive electrode terminal 11 is defined as x-direction.

In the lithium-ion secondary battery of the present invention, the x-direction distance from the positive electrode terminal to a boundary surface 4 of the positive-electrode active material applying section 3 from which the positive electrode tab 2a is pulled out becomes smaller as the z-direction distance increases.

FIG. 2 is an enlarged view illustrating a portion of C near the positive electrode terminal in FIG. 1.

Among the boundary sections 4 between the positive-electrode active material applying sections 3 formed on the positive electrode current collectors 2 of the positive electrodes 1 and the non-applying sections that function as the positive electrode tabs 2a, if a positive electrode having the longest x-direction distance between a connection position 11a of a portion in which a positive electrode tab is connected to the positive electrode terminal 11 and which is closest to the positive-electrode active material side and a boundary section 4 between the active material's applying and non-applying sections is regarded as a reference positive electrode 1a, a positive electrode having a larger z-direction distance from the reference positive electrode 1a is preferably disposed in such a way that the distance b to the boundary section 4 in x-direction is smaller than the distance a from the connection position 11a to the boundary section of the reference positive electrode 1a in x-direction.

However, if the electrodes are shifted excessively, the area where the positive and negative electrodes do not face each other would increase, resulting in a decrease in the capacity of the battery. Therefore, it is preferred that the positional shift should be kept as minimum as possible.

Incidentally, as for battery elements described in the embodiment shown in FIG. 2, one end of a negative electrode 6 is located on a negative electrode tip position line 6a, which indicates the tip of a negative electrode.

Meanwhile, in the case where positive electrodes of the same size are used as each positive electrode and negative electrodes of the same size are used as each negative electrode, if the end portion of a positive electrode is shifted from the end portion of a negative electrode by a certain amount, the positive electrode ends up being shifted toward the positive electrode terminal by the same amount.

In the case of the lithium-ion secondary battery, a negative electrode needs to be disposed in such a way as to be in a portion that faces across a separator of a positive electrode. The amount of positional shift of the positive electrode toward the positive electrode terminal needs to be accurately disposed in such a way as to ensure that the negative electrode exists in a portion that faces the positive electrode even at the negative electrode terminal's side.

Figure 4:
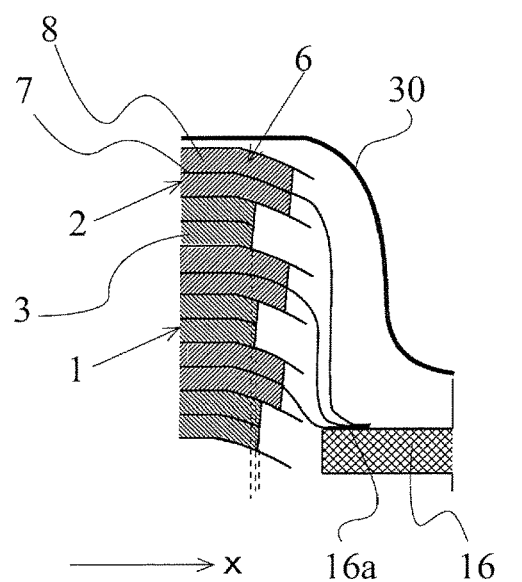
FIG. 4 is a diagram illustrating a cross-section of a portion of a negative electrode terminal side.

The description here focuses on the state of stacking on the negative electrode terminal's side when the positive electrode terminal's side is formed in such a state. As shown in FIG. 4, which is a diagram illustrating a cross-section of a portion of the negative electrode terminal's side, even at the negative electrode terminal 16's side, a positive electrode 1 is shifted toward the positive electrode terminal's side.

Accordingly, at the negative electrode terminal's side, the x-direction positions of the end portions of the positive electrodes are not aligned with each other and are shifted in a stepwise manner. Therefore, a negative electrode 6 that is closer to an outermost layer has a longer negative-electrode active material applying section 8 that does not face an applying section of a positive-electrode active material. As a result, the end portion of the negative electrode can be easily bent toward a negative electrode current collector connection section. In this example, it is possible to reduce the risk that the negative electrode current collector will break.

In this manner, even if the number of layers stacked is increased, the negative electrode current collectors are curved along the negative electrodes that are formed in a stepwise pattern. Therefore, in particular, it is possible to reduce the possibility that the breakage of a current collector in the applying and non-applying sections of active material will occur.

In this case, due to variations in the manufacturing, as for each positive electrode, the position of the boundary section and the length of the applying and non-applying sections have tolerances. If the amount of positional shift is small, the boundary section of a positive electrode that is far from the reference positive electrode may have a larger distance to the connection position 11a than the boundary section of a positive electrode that is near the reference positive electrode 1a.

According to the present invention, the expression "b becomes smaller as z becomes larger" means that b tends to become smaller toward an outermost-layer positive electrode from the reference positive electrode. Even if some of the positive electrodes do not have the tendency due to manufacturing tolerances, these positive electrodes are not exempted from the present invention.

Moreover, in the case of the present invention, as the layers stacked are increased in number, or as the thickness of an electrode-stacked body is increased, advantageous effects become particularly noticeable. Therefore, as for a positive electrode that has a z-direction distance from the reference positive electrode 1a that is greater than or equal to a predetermined level, the positive electrode may be disposed in such a way that a x-direction distance b from the boundary section to the connection position 11a is closer than a x-direction distance a from the boundary section of the reference positive electrode to the current collector connection section.

If all the positive electrodes except the reference positive electrode are stacked in such a way as to be positionally shifted, the amount of positional shift increases as the number of layers stacked becomes larger, possibly causing a decrease in the capacity of the battery as described above.

Therefore, by positionally shifting mainly positive electrode layers that are close to the outermost layer where the collector foil can easily break, it is possible to minimize a decrease in the capacity of the battery.

Incidentally, a predetermined or greater distance may vary according to the thickness of the current collector. For example, if the collector foil is 40 μm or less in thickness, the distance z from the reference positive electrode to a positive electrode with the largest z-direction distance is 3 mm or more, or particularly preferably 4 mm or more.

As shown in FIG. 3, which is an enlarged view illustrating a portion of C near the positive electrode terminal in FIG. 1, as for a positive electrode with a z-direction distance from the reference positive electrode that is greater than or equal to a predetermined level, the end portion of the positive electrode is preferably bent toward the positive electrode terminal 11, with the positive-electrode active material applying section as a starting point.

One of the areas where the positive electrode current collector can easily break is a boundary section 4 between the applying and non-applying sections of positive-electrode active material. One of the causes is a large curvature of the collector foil in the boundary section of the outermost layer's side.

As shown in FIG. 3, by shifting the positive electrode of the outermost layer's side toward the current collector connection section, it becomes possible to bend the positive electrode toward the positive electrode terminal with the active material as a starting point, thereby reducing the possibility that the positive electrode current collector will break.

As shown in FIG. 4, which is a diagram illustrating a cross-section of a portion of the negative electrode terminal's side, even at the negative electrode terminal's side, the positive electrodes 1 are shifted toward the positive electrode terminal's side.

Accordingly, at the negative electrode terminal's side, the x-direction positions of the end portions of the positive electrodes are not aligned with each other and are shifted in a stepwise manner. Therefore, a negative electrode 6 that is closer to an outermost layer has a longer negative-electrode active material applying section 8 that does not face an applying section of a positive-electrode active material. As a result, the end portion of the negative electrode can be easily bent toward a negative electrode current collector connection section.

Figure 5:
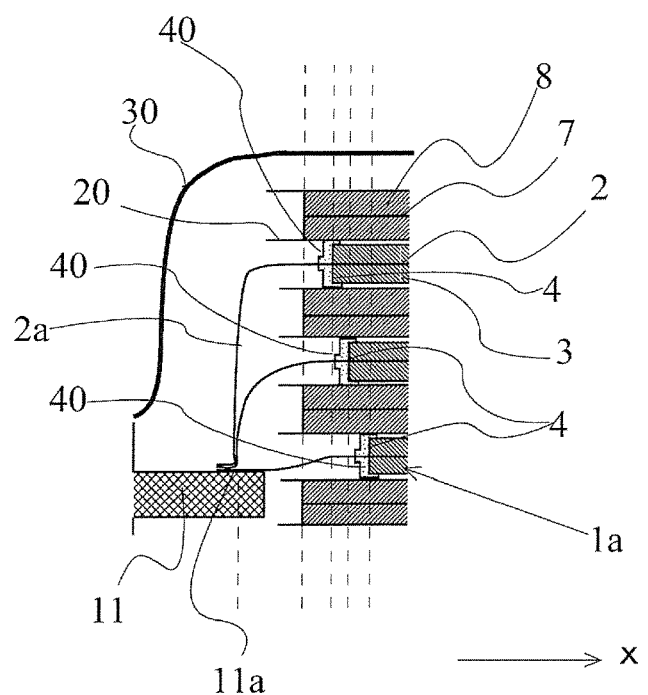
FIG. 5 is a diagram illustrating another embodiment of the present invention, and is a diagram showing a portion of C in FIG. 1.

FIG. 5 is a diagram illustrating another embodiment of the present invention, and is a diagram showing a portion of C in FIG. 1.

To prevent the dropping of active material and other trouble, insulation members 40 are formed in such a way as to cover the boundaries between the applying and non-applying sections of positive-electrode active material.

If an insulation member that is provided on the surface of a positive-electrode active material applying section 3 overlaps at the same position, the thickness of an area where an insulation section exists becomes very large, leading to an increase in the curvature of a positive electrode tab of the outermost layer's side. Moreover, the difference in thickness between the area where the insulation section exists and an area where no insulation section exists becomes very large. In this case, the electrode-stacked body has a concave central portion. The shape is not preferred in terms of the appearance and the stability of electrical characteristics. Accordingly, in the case of FIG. 5, the layers are stacked in such a way as to be positionally shifted. Therefore, the insulation members 40 of the layers are positionally shifted in x-direction, too. Accordingly, the area where the insulation sections overlap with one another at the same positions is reduced, and an increase in the thickness of the electrode-stacked body is curbed, and an increase in the curvature of the active material is prevented. In this manner, such remarkable advantageous effects can be obtained.

Incidentally, in this diagram, in order to make clear the positions of the insulation members 40 provided on the positive-electrode active material applying sections 3, the components are linearly shown. Therefore, it looks as if there are spaces between the positive-electrode active material applying sections 3 and the separators 20. However, in an actual battery, a positive electrode, a separator, and a negative electrode are gradually curved from the side of a thick insulation member 40 that is large in thickness, and the members are in close contact with each other.

Figure 6:
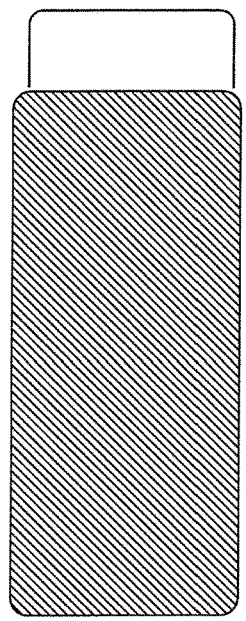
FIG. 6A and FIG. 6B are diagrams illustrating a positive electrode and a negative electrode according to one embodiment of the present invention.
Figure 6:
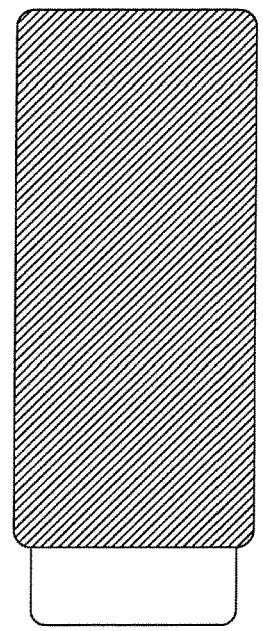

In FIG. 1, the positive electrode terminal 11 and the negative electrode terminal 16 are pulled out from different sides of the lithium-ion secondary battery 100 that face each other, as the positive electrodes 1 shown in FIG. 6A and the negative electrodes 6 shown in FIG. 6B are alternately stacked through separators.

Figure 7A:
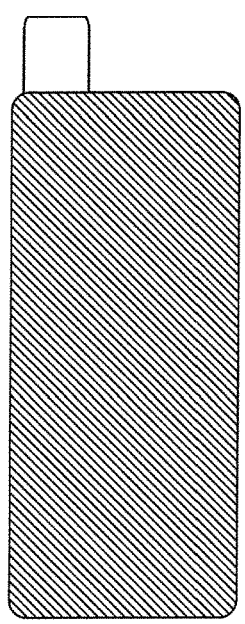
FIG. 7A and FIG. 7B are diagrams illustrating a positive electrode and a negative electrode according to another embodiment of the present invention.
Figure 7B:
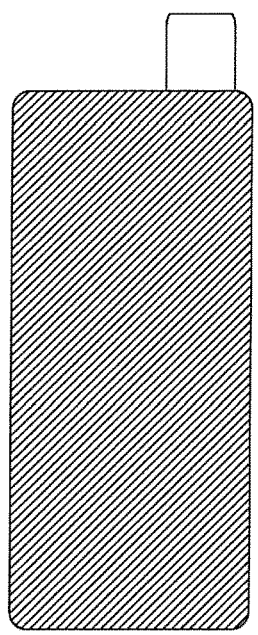

The configuration is not limited to this. The positive electrodes 1 shown in FIG. 7A having positive electrode tabs whose width is less than 50% of the electrode width thereof, and the negative electrodes 6 shown in FIG. 7B having negative electrode tabs whose width is less than 50% of the electrode width thereof, may be alternately stacked through separators, and a positive electrode terminal and a negative electrode terminal may be pulled out from the same side (not shown).

As the insulation members that are formed in the boundary sections between the applying and non-applying sections of positive-electrode active material, polyimide, glass fiber, polyester, polypropylene, or a composition containing these substances may be used. To form the insulation members, members of these substances may be welded to the boundary sections by applying heat, or gel-like resin may be applied to the boundary sections and dried. However, the method is not specifically limited to these. It is preferred that the thickness of the insulation members be made as small as possible in terms of volumetric efficiency. However, in terms of insulation and strength, the thickness is particularly preferably greater than or equal to 7 μm and less than or equal to 100 μm, or more preferably greater than or equal to 15 μm and less than or equal to 50 μm.

Furthermore, by positionally shifting a positive electrode layer of the outermost layer's side relative to the reference positive electrode, a local increase in the thickness associated with the insulation members is reduced, and the thickness-direction size of the battery can be made smaller.

If the thickness-direction size is made equal to that of a conventional battery, the insulation members that are greater in thickness than conventional ones can be used.

The width and thickness of a tab affect how easily the tab or collector foil can break. In the case of the present invention, it was confirmed that, when the collector foil that is 200 mm or less in width and 40 μm or less in thickness is used, or particularly when the thin collector foil that is 20 μm or less in thickness is used, remarkable advantageous effects can be obtained.

In this case, the electrode tabs are welded together to a one-side surface of an electrode terminal. However, the tabs may be separated and welded to both sides of the electrode terminal.

EXAMPLES

Example 1

Production of Positive Electrode

As an active material, a composite oxide containing lithium manganate and lithium nickelate was used. As a conductive agent, carbon black was used. As a binder, PVdF was used. Slurry was prepared as these substances were dispersed in an organic solvent.

The slurry was continuously applied and dried on a piece of aluminum foil with a thickness of 20 μm, which was a positive electrode current collector. A positive electrode roll was produced in such a way as to include an applying section 2 of the positive electrode current collector and a non-applying section where the substance was not applied.

From the positive electrode roll, a positive electrode that was 220 mm long and 95 mm wide and which had one surface of active material with a thickness of 80 μm was produced in such a way as to leave a non-applying section that would become a tab to be connected to the positive electrode terminal as shown in FIG. 6A.

Production of Negative Electrode

As an active material, graphite was used. As a conductive agent, carbon black was used. As a binder, PVdF was used. Slurry was prepared as these substances were dispersed in an organic solvent.

The slurry was continuously applied and dried on a piece of copper foil with a thickness of 10 μm, which was a negative electrode current collector. A negative electrode roll was produced in such a way as to include an applying section of the negative electrode current collector and a non-applying section where the substance was not applied.

From the negative electrode roll, an electrode that was 225 mm long and 100 mm wide and which had one surface of active material with a thickness of 60 μm was produced in such a way as to leave a non-applying section that would become a tab to be connected to the negative electrode terminal as shown in FIG. 6B.

Production of Power Generation Element

A separator made of polypropylene that was 230 mm long, 105 mm wide, and 25 μm thick was disposed. A power generation element was produced in such a way that the distance from a boundary section of positive-electrode active material on a reference positive electrode to a connection position of a positive electrode terminal and a positive electrode tab closest to the positive electrode active material's side, or to the connection position 11a shown in FIG. 2, was 14 mm. Incidentally, the reference positive electrode was set as the 15$^{th}$ positive electrode located at the center in the stacking direction.

Twenty-nine positive electrodes and 30 negative electrodes obtained were alternately stacked through separators with a thickness of 30 μm, which were of a two-layer structure of polypropylene and polyethylene, in such a way that a negative electrode became an outermost layer. As a result, a stacked body with a thickness of 10 mm was obtained. Moreover, a negative electrode tab and a positive electrode tap were disposed in such a way as to be taken out from the sides of the stacked body that faced each other.

The non-applying sections of the layers of positive electrodes were welded together on a positive electrode terminal made of aluminum. The non-applying sections of the layers of negative electrodes were welded together on a negative electrode terminal in which a surface of copper was plated with nickel.

When the layers were stacked, the layers were stacked in such a way that the end surfaces of positive electrode taps were aligned with one another. Accordingly, as shown in FIG. 2, a positive electrode that had a larger distance in the stacking direction from the positive electrode terminal was disposed in such a way that a boundary between the applying and non-applying sections of electrode active material was located closer to the positive electrode terminal's side in x-direction.

At this time, the x-direction distance from a positive electrode collector foil connection section to the boundary section of the reference positive electrode was made closer than a creepage distance of a positive electrode tab that extended from the positive electrode collector foil connection section to the boundary section of the reference positive electrode. Moreover, when the positive electrode collector foil and the positive electrode terminal were connected, the positive electrode terminal was disposed in such a way that only the positive electrode current collector was slightly curved, while the applying section of positive-electrode active material was not curved.

Meanwhile, the negative electrodes were stacked in such a way as to be aligned with the end surfaces of the negative electrodes on the positive electrode terminal's side. In this manner, since the end surfaces of the positive electrode tabs were aligned with each other, the end portions of the positive electrodes on the negative electrode terminal's side were arranged and stacked in a stepwise pattern in such a way that an inner layer's side had a smaller distance to a connection section between the negative electrode terminal and the negative electrode current collector than the outermost layer. Accordingly, the negative electrode current collector of the negative electrode terminal's side was curved along a positive electrode. Therefore, compared with when the positive electrodes were not positionally shifted, the negative electrode current collector of the negative electrode terminal's side was curved toward the negative electrode terminal in such a way as to have a gentle curvature.

Production of Lithium-Ion Secondary Battery

In the power generation element produced, the reference positive electrode was at the center in the stacking direction. Therefore, both flexible films had a housing section that matches the outer shape of the electrode-stacked body.

The peripheries of the two flexible films were thermally welded together, and the electrode-stacked body was housed inside the flexible films in such a way that one end of the positive electrode terminal and one end of the negative electrode terminal were pulled out of the flexible films.

At this time, only one side that was different from the sides from which the positive electrode terminal and the negative electrode terminal were pulled out was not thermally welded, and was used as an opening through which electrolysis solution would be poured. Then, through the opening, electrolysis solution was poured for sufficient impregnation.

After that, the opening was thermally welded, and all the peripheries of the flexible films were thermally welded together as a result.

Evaluation Test

The produced lithium-ion secondary battery was housed in an evaluation casing and was evaluated.

An evaluation casing 80 was made by fitting together a box section 80a, which included a battery mounting section, and a lid section (not shown), which served as a lid of the box section. FIG. 8 shows the appearance thereof.

In the positive electrode terminal and negative electrode terminal of the lithium-ion secondary battery, screw-holding holes 81 and 82 were provided. A buffer member or the like was not provided around the lithium-ion secondary battery or the tabs. Into the holes of the positive electrode terminal and negative electrode terminal, a pin was inserted to hold a positive electrode terminal provided on the evaluation case, and a pin was inserted to hold a negative electrode terminal. By only using the pins, the lithium-ion secondary battery 100 was fixed to the evaluation casing.

After that, the lid section was fitted thereon. From outside the evaluation casing, a force of impact was applied with an acceleration of 150G in a direction from the negative electrode terminal to the positive electrode terminal, and in a direction from the positive electrode terminal to the negative electrode terminal. At this time, the state of positive electrode tabs and negative electrode tabs in the boundary sections of 20 lithium-ion secondary batteries was observed.

As a result, a battery in which both the positive electrode tabs and the negative electrode tabs broke was not confirmed. Only one of the positive electrode tabs suffered a small broken portion that was less than 100 μm. However, the broken portion was not serious enough to affect the characteristics and reliability of the product. No broken portion was confirmed in the negative electrode tabs.

The reason why the negative electrode tabs were not broken or cut may be that, since the negative electrode tabs were curved from the applying sections of negative-electrode active material along the end portions of the positive electrodes of the negative electrode's side that were arranged in a stepwise pattern, the curvature of the boundary sections between the applying and non-applying sections of negative-electrode active material was small.

The reason why the positive electrode tabs were not broken may be that the boundary sections of the positive electrodes were kept from being aligned with one another, and the positive electrodes' end portions of the positive electrode terminal's side and the negative electrodes' end portions could be shifted to the reference positive electrode's side by an amount equivalent to a difference in level between the applying and non-applying sections of active material, and the breakage of the foil in the boundary sections was therefore prevented.

The reason why only one tab was slightly cut may be that, since the collector foil was sagging slightly, a large load was instantaneously applied to one positive electrode tab when a force of impact was given. However, compared with comparative examples described later, a sufficient advantageous effect of reducing the cut was confirmed.

Example 2

A lithium-ion secondary battery was produced and evaluated in a similar way to Example 1 except that: when the positive electrodes and the negative electrodes were stacked in such a way that the end surfaces of the positive electrode tabs were aligned with each other, the distance from a boundary section of active material to the connection position closest to the positive-electrode active material's side, or to 11a shown in FIG. 2, was set to 8 mm; and the electrodes were disposed in such a way that a positional shift between the reference positive electrode and a boundary section of the applying and non-applying sections of outermost layer's positive-electrode active material came to 1.3 mm; and, when the positive electrode collector foil and the positive electrode terminal were connected, the positive electrodes were slightly bent toward a current collector connection section with the position of a positive-electrode active material applying section as a base point.

As a result of the evaluation, a battery in which both the positive electrode tabs and the negative electrode tabs broke, or a battery in which the tabs were partially cut, was not confirmed.

The reason may be that, since the positive electrodes were bent toward the positive electrode current collector connection section with the position of the positive-electrode active material applying section as a base point, the curvature of the positive electrodes in the boundary sections was small compared with Example 1, thereby preventing the tabs from being broken or slightly cut in the boundary sections.

Example 3

A lithium-ion secondary battery was produced and evaluated in a similar way to Example 1 except that: the first to $11^{th}$ layers from the reference positive electrode were stacked in such a way as to avoid a positional shift in the stacking; and the $12^{th}$ to $15^{th}$ positive electrodes were disposed in such a way as to be gradually shifted to the positive electrode terminal's side by 0.5 mm apiece. Incidentally, the $12^{th}$ to $15^{th}$ positive electrodes were being curved toward a positive electrode current collector connection section.

As in the case of Example 2, as a result of the production and evaluation of the lithium-ion secondary battery, a battery in which the positive electrode tabs and the negative electrode tabs broke, or a battery in which the tabs were partially cut, was not confirmed.

Incidentally, the z-direction distance from a surface where a current collector connection section of the reference positive electrode was formed to a current collector in an outermost layer's boundary section was 4 mm. Moreover, compared with Example 1, it was confirmed that a larger capacity was obtained. In this example, the layers were stacked by setting an amount of displacement in an automated assembly device.

Example 4

A lithium-ion secondary battery was produced and evaluated in a similar way to Example 3 except that: an insulation member that was 30 μm in thickness and 5 mm in width was formed in a boundary section of the applying and non-applying sections of positive-electrode active material.

As a result of the evaluation, a battery in which both the positive electrode tabs and the negative electrode tabs broke, or a battery in which the tabs were partially cut, was not confirmed. Compared with comparative examples described below, the electrodes could be made smaller in thickness.

Comparative Example 1

A lithium-ion secondary battery was produced and evaluated in a similar way to Example 1 except that the positive and negative electrodes were set in such a way that the boundary lines of the applying and non-applying sections of positive-electrode active material were aligned with one another in X-direction.

As a result of the evaluation, it was confirmed that five out of 20 lithium-ion secondary batteries had their tabs broken, and that another five lithium-ion secondary batteries suffered a cut of about 2 mm to 5 mm in their positive electrode tabs.

Comparative Example 2

A lithium-ion secondary battery was produced and evaluated in a similar way to Example 4 except that the positive and negative electrodes were set in such a way that the boundary lines of the applying and non-applying sections of positive-electrode active material were aligned with one another in X-direction.

As a result of the evaluation, it was confirmed that eight out of 20 lithium-ion secondary batteries had their tabs broken, and that another six lithium-ion secondary batteries suffered a cut of about 2 mm to 5 mm in their positive electrode tabs.

INDUSTRIAL APPLICABILITY

A lithium-ion secondary battery covered with the film exterior material of the present invention has strong resistance against shock. Therefore, the lithium-ion secondary battery is suitable as a source of electric energy in fields where shock or vibration could be applied, such as electric bicycles and electric cars.

EXPLANATION OF REFERENCE SYMBOLS

1: Positive electrode
1a: Reference positive electrode
2: Positive electrode current collector
2a: Positive electrode tab
3: Positive-electrode active material applying section
4: Boundary section
6: Negative electrode
6a: Negative electrode tip position line
7: Negative electrode current collector
8: Negative-electrode active material applying section
11: Positive electrode terminal
11a: Connection position closest to positive-electrode active material's side
16: Negative electrode terminal
20: Separator
30: Flexible film
40: Insulation member
80: Evaluation casing
80a: Box section
81, 82: Screw-holding hole
100: Lithium-ion secondary battery
110: Power generation element

The invention claimed is:

1. A lithium-ion secondary battery, comprising:
an electrode-stacked body including
a plurality of positive electrodes, each of said positive electrodes including an applying section of a positive-electrode active material on a positive electrode current collector, and a non-applying section of a positive-electrode active material which becomes a positive electrode tab,
a plurality of negative electrodes, each of said negative electrodes including an applying section of a negative-electrode active material on a negative electrode current collector, and a non-applying section of a negative-electrode active material which becomes a negative electrode tab, and
a separator, wherein the plurality of positive electrodes and negative electrodes are alternately stacked via separators;
a positive electrode terminal that is electrically connected to the positive electrode tabs; and
a negative electrode terminal that is electrically connected to the negative electrode tabs, wherein
the electrode-stacked body, an electrolysis solution, the positive electrode terminal, and the negative electrode terminal are housed in an exterior body except for one end of the positive electrode terminal and one end of the negative electrode terminal, and
when, among the plurality of positive electrodes, a positive electrode, in which a distance in a stacking direction from a connection section between the positive electrode tab and the positive electrode terminal to a boundary section between the applying and non-applying sections of the positive-electrode active material is shortest, is set as a reference positive electrode, a distance in a direction perpendicular to the stacking direction from a connection section between the positive electrode tab and the positive electrode terminal to a boundary section between the applying and non-applying sections of the positive-electrode active material in a positive electrode stacked at a position farthest from the reference positive electrode is shorter than a distance in a direction perpendicular to the stacking direction from a connection section between the positive electrode tab and the positive electrode terminal in the reference positive electrode to a boundary section between the applying and non-applying sections of the positive-electrode active material.

2. The lithium-ion secondary battery according to claim 1, wherein
from the reference positive electrode toward a layer of positive electrode that is stacked at a position that is farthest from the reference positive electrode, the distance from the boundary section to the connection section becomes gradually shorter.

3. The lithium-ion secondary battery according to claim 1, further comprising
an insulation section formed in a boundary section of applying and non-applying sections of the positive-electrode active material.

4. The lithium-ion secondary battery according to claim 1, wherein
the positive electrode tabs and the negative electrode tabs are pulled out from the same side of the exterior body.

5. The lithium-ion secondary battery according to claim 1, wherein
the positive electrode tabs and the negative electrode tabs are pulled out from different sides of the exterior body that face one another.

6. The lithium-ion secondary battery according to claim 2, further comprising
an insulation section formed in a boundary section of applying and non-applying sections of the positive-electrode active material.

7. The lithium-ion secondary battery according to claim 2, wherein
the positive electrode tabs and the negative electrode tabs are pulled out from the same side of the exterior body.

8. The lithium-ion secondary battery according to claim 2, wherein
the positive electrode tabs and the negative electrode tabs are pulled out from different sides of the exterior body that face one another.

\* \* \* \* \*